July 27, 1965 B. STACH 3,197,080

HOPPER SHUT-OFF CONTROL FOR SEED SOWING MACHINE

Filed Oct. 22, 1963

INVENTOR.
BENEDICT STACH
BY
ATTORNEY

United States Patent Office 3,197,080
Patented July 27, 1965

3,197,080
HOPPER SHUT-OFF CONTROL FOR
SEED SOWING MACHINE
Benedict Stach, 15273 Fordham Ave., East Detroit, Mich.
Filed Oct. 22, 1963, Ser. No. 318,038
2 Claims. (Cl. 222—177)

The present invention relates to a seed sowing machine and more particularly to an improved manually operated remote controlled closure plate for regulating communication between the hopper and its dispensing casing.

The present invention is an improvement over my issued United States Patent No. 2,761,589, dated September 4, 1956, entitled, "Seed Sowing Machine."

The present invention, as in the earlier issued patent provided wheel operated rotative means for receiving from the hopper predetermined and measured quantities of seed or other materials stored therein for dispensing the same through the outlet of the casing.

The present invention has for the primary object a control means for regulating, closing and progressively opening communication between the hopper and the dispensing casing as desired.

These and other objects will be seen from the following specification and claims in conjunction with the appended drawings in which:

Figure 1:
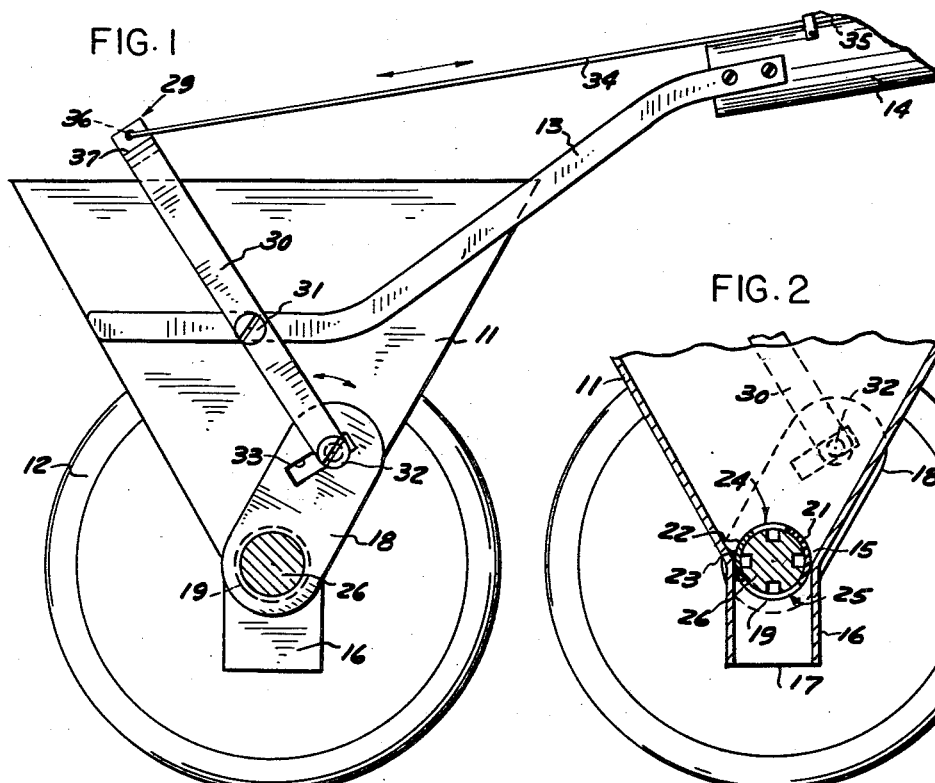
FIG. 1 is a fragmentary side elevational view of the present seed sowing machine partly sectioned.

It will be understood that the above drawing illustrates merely a preferred embodiment of the invention, and that other embodiments are contemplated within the scope of the claims hereafter set forth.

Referring to the drawings, the present seed sowing machine includes hopper 11 supported upon a pair of wheels 12, the fork 13 secured to the hopper and terminating in the rearwardly extending handle 14 fragmentarily shown.

A horizontally disposed casing 16 is connected to the underside of the hopper. At the top of the casing there is an inlet opening 15 communicating with the hopper, said casing having an outlet opening 17 at its bottom for dispensing seed or other materials stored within said hopper.

Figure 4:
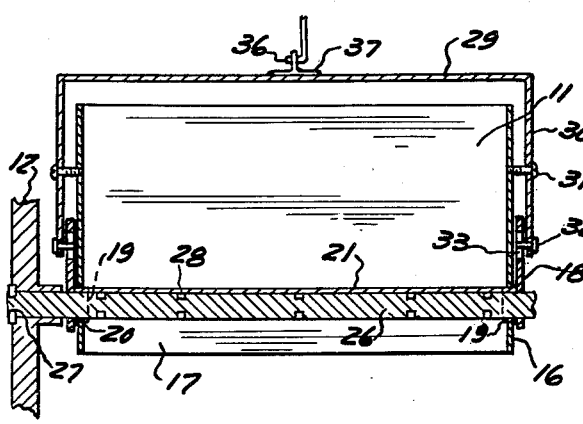
FIG. 4 is a fragmentary section taken in the direction of arrows 4—4 of FIG. 3.

A pair of arms 18 are arranged adjacent opposite ends of the hopper on the exterior thereof and include adjacent their one ends the inwardly directed sleeves 19 which are journaled through corresponding apertures 20 in the adjacent side walls of the hopper and casing, FIG. 4. The elongated transversely arcuate rotary hopper closure plate 21 extends the length of the hopper on its interior and at its ends is joined to inner portions of sleeves 19 adapted for rotary movement therewith.

Figure 2:
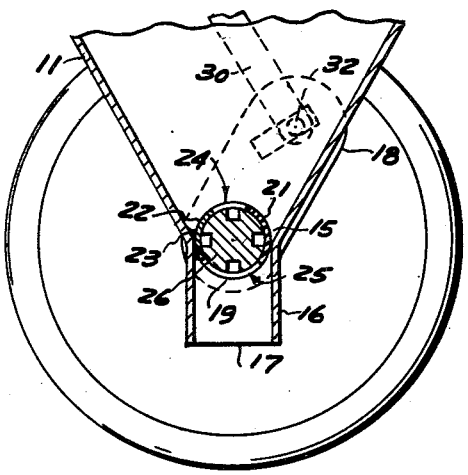
FIG. 2 is a fragmentary vertical section of the hopper assembly with the rotative closure plate in open position.

In one position of adjustment of rotary arms 18, FIG. 2, communication is established as at 24 between hopper 11 and casing 16 and relative to the elongated transversely arcuate stop plate 22. Plate 22 is anchored to interior portions of the hopper and casing adjacent inlet opening 15 as by welds 23.

In the position of closure plate 21 shown in FIG. 2, opening 24 is provided between one edge of the closure plate and an adjacent longitudinal edge of arcuate stop plate 22. At the same time, the other longitudinal edge of the closure plate defines with the corresponding other edge of stop plate 22 a further elongated aperture 25 providing communication to the interior of casing 16.

A cylindrical roller 26 is horizontally disposed within the inlet opening 15 between hopper 11 and casing 16 and is supported and journaled through sleeves 19, FIG. 4. Said roller extends outwardly of the walls of said hopper and has secured thereto the pair of spaced wheels 12. At least one wheel is keyed as at 27 to the roller for assuring rotation of the said roller upon rotation of at least one of the wheels 12 as moved along the ground surface.

The walls of roller 26 have along its length, but on the interior of casing 16 a plurality of radially spaced rows of spaced openings 28 into which measured quantities of seed or other material may drop from hopper 11. Accordingly, on movement of the seed sowing machine along the ground surface and corresponding rotation of wheels 12, there will be simultaneous rotation of roller 26 by which those apertures 28 initially filled with seed or other pulverized material will alternately be facing downwardly and will empty permitting the seed to drop through casing 16 and its outlet 17 upon the ground surface.

Hopper remote control

The seed showing machine includes a manually operated linkage means connected with the hopper and its associated handle 14 for effecting arcuate rotary movements as desired of the pair of control arms 18.

The said manually operated remote controlled linkage means includes a U-shaped stirrup 29 whose free end portions 30 are pivotally mounted as at 31 to end wall portions of the hopper and function as levers. The one or outer ends of said levers carry the inwardly directed pins 32 which loosely nest within apertures 33 or slots formed in or adjacent end portions of arms 18.

The elongated push and pull rod 34 overlies portions of handle 14 and may be loosely clipped thereto as at 35, FIG. 1. Rod 34 includes at its outer end of the angle portion or hook 36 which is flexibly and pivotally connected to bracket 37 on a central rear portion of stirrup 29.

Operation

In operation and with the arms 18 and connected linkage means in the positions shown in FIGS. 1 and 2, the hopper closure plate 21 is in an open position relative to the stop 22 in inlet opening 15. Communication is thus established between the hopper and exposed portions of roller 26.

Figure 3:
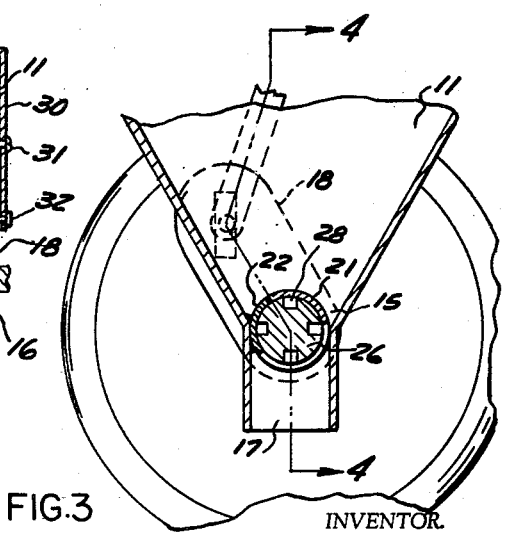
FIG. 3 is a similar view with said closure plate in closed position.

By effecting a longitudinal movement of pull rod 34, the arms 18 may be rotated to the position shown in FIG. 3 wherein the arcuate closure plate 21 is in registry with stop 22 closing off communication between the hopper and apertured roller 26. In this position, no seed or other granulated material can pass from the hopper into and through outlet casing 16.

In the operation of the present control, the pull rod 34 may be manually moved to intermediate positions to thus progressively open or close communication between the hopper and casing to the extent desired.

Having described my invention, reference should now be had to the following claims.

I claim:
1. In a seed sowing machine, a hopper;
a horizontally disposed casing connected to the underside of the hopper, the casing at its top having an inlet opening communicating with the hopper, and an oulet opening at its bottom;
a cylindrical roller horizontally disposed within the inlet opening journaled upon the hopper and extending at each end outwardly therefrom;
the wall of the roller having along its length confined within the casing a plurality of rows of spaced openings;
a traction wheel upon each end of the roller, at least one of said wheels being keyed to the roller for rotating the same with rotation of said wheel;
an elongated transversely arcuate rotary hopper closure plate extending the length of said hopper on its interior, co-axially of said roller;

said closure plate in one position closing off communication between said hopper and casing, and rotatable to progressively open communication therebetween;

tubular supports on the ends of said closure plate journaled through the walls of the hopper, said roller supported and journaled through said supports;

and a manually operated remote controlled linkage means connected to said closure plate for rotating the same, said means including rockable arms at their one ends secured to end portions of said tubular supports;

levers pivoted upon said hopper and at their one ends flexibly and pivotally connected, respectively, with the other ends of said arms;

an operating handle connected to and projecting rearwardly from said hopper;

a longitudinally reciprocal pull rod slidably mounted on said handle, extending rearwardly of the hopper and at its forward end pivotally connected to the other ends of said levers, respectively.

2. In the seed sowing machine of claim 1, a substantially upright, elongated transversely arcuate stop plate adjacent the inlet of said casing and secured to said hopper;

and including a first longitudinal edge at its top extending into said hopper;

said rotary hopper closure plate having a second longitudinal edge engageable with said first longitudinal edge of said stop plate and progressively movable away therefrom for regulating communication into said casing.

References Cited by the Examiner

UNITED STATES PATENTS 1,859,625   5/32   Laing _____ 222—317 X
2,906,437   9/59   Wallis _____ 222—177

LOUIS J. DEMBO, *Primary Examiner.*